Sept. 13, 1932.  J. R. KEITH  1,877,666

FRUIT AND VEGETABLE FIELD CRATE

Filed June 11, 1930   2 Sheets-Sheet 1

J. R. Keith,
INVENTOR

BY Victor J. Evans
ATTORNEY

WITNESS:

Sept. 13, 1932.  J. R. KEITH  1,877,666
FRUIT AND VEGETABLE FIELD CRATE
Filed June 11, 1930   2 Sheets-Sheet 2
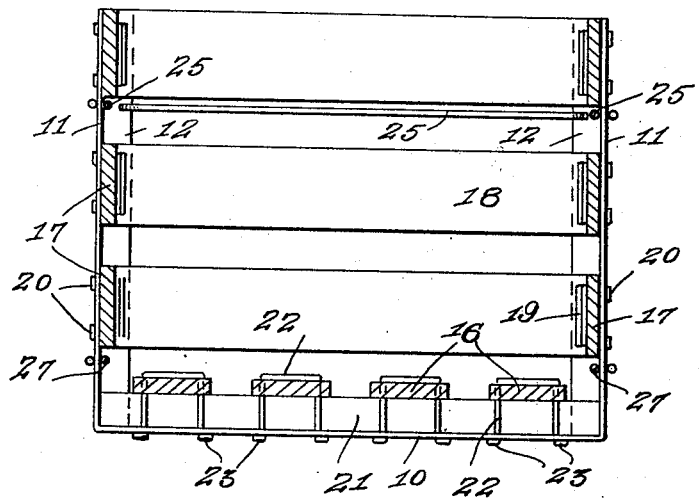
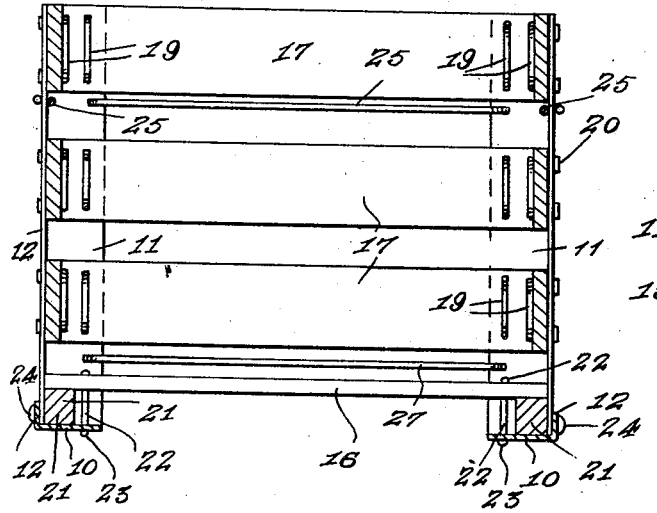
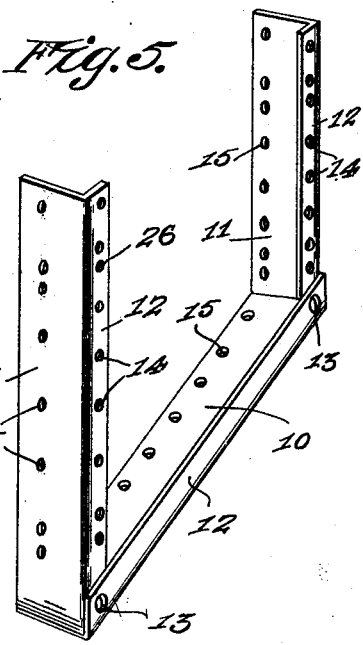
J. R. Keith, INVENTOR
BY Victor J. Evans
ATTORNEY
WITNESS:

Patented Sept. 13, 1932

1,877,666

UNITED STATES PATENT OFFICE

JAMES R. KEITH, OF BENTONVILLE, ARKANSAS

FRUIT AND VEGETABLE FIELD CRATE

Application filed June 11, 1930. Serial No. 460,470.

This invention relates to crates capable of use as an egg crate or egg case, but which is especially adapted for use as a field crate for transporting vegetables and fruits from the fields and orchards to the packing and canning sheds.

An object of the present invention is to provide a crate which is simple, strong and durable in construction, easily handled, and may be stacked without injury to its contents.

With the above and other objects in view, the invention further includes the following novel features and details of construction, to be hereinafter more fully described, illustrated in the accompanying drawings and pointed out in the appended claim.

In the drawings:—

Figure 3 is a section on the line 3—3 of Figure 1.

Figure 4 is a section on the line 4—4 of Figure 2.

Figure 5 is a detail perspective view of one of the end frames of the crate.

Figure 1:
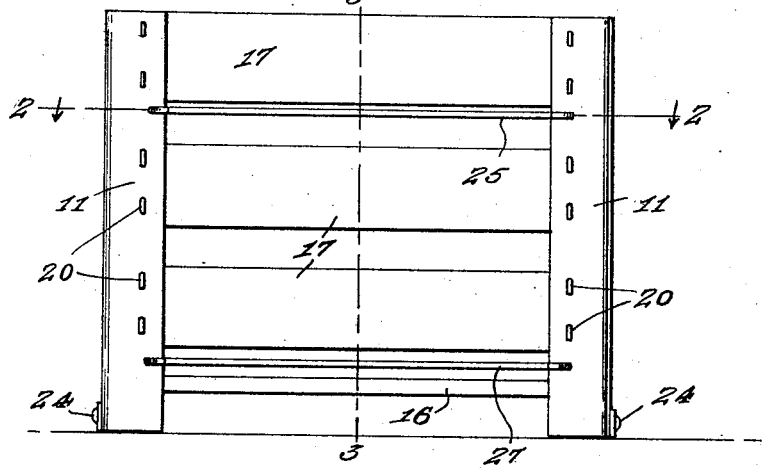
Figure 1 is an elevation of a crate constructed in accordance with the invention.
Figure 2:
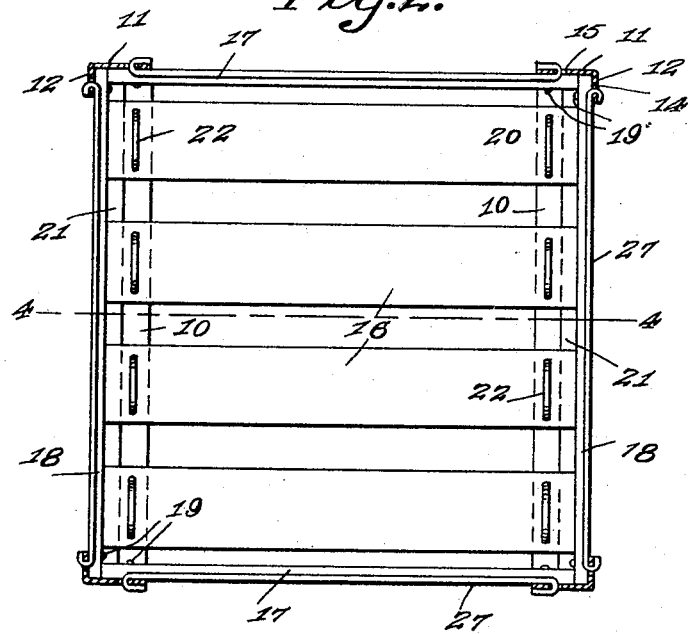
Figure 2 is a sectional view on the line 2—2 of Figure 1.

Referring to the drawings in detail wherein like characters of reference denote corresponding parts, the crate as shown comprises a pair of end frames of substantially U shape. These frames are formed of sheet metal transversely slitted and bent to provide a horizontal portion 10 which is angular in cross section and vertical portions 11 of similar cross sectional shape. These vertical portions extend from and are integral with the opposite ends of the horizontal portions and both portions include flanges 12. The flanges are provided with registering openings 13 for the passage of fastening devices to be later described. The frames are also provided with spaced openings 14 and 15.

The end frames are connected by spaced bottom slats 16, end slats 17 and side slats 18. The ends of the side and end slats extend within the vertical portions 11 of the frames and are secured therein by means of wire staples 19 which extend through openings provided in these slats and through the openings 14 and 15 of the vertical portions of the frames, and are bent over or upset as shown at 20. The bottom slats 16 rest upon sills 21 which extend along the horizontal portions of the end frames, and are secured to the frames by means of staples 22 which extend through openings provided in the slats 16 and through the openings 15 in the horizontal portions of the frames. The extremities of the staples are bent or upset as shown at 23, after the manner of the staples 19 so that they will be securely held in place. Nails or like fastening devices 24 are driven through the openings 13 into the sills 21.

By reference to Figures 1, 3 and 4 of the drawings it will be seen that the bottom slats 16 are spaced upward from the bottoms of the end frames. This permits the crates to be stacked without injury to the vegetables or fruits therein should the latter extend slightly above the tops of the crates.

The end frames are connected by upper horizontally disposed tie rods 25 whose opposite ends are secured within openings 26 provided in the frames. Additional tie rods 27 extend along the lower portions of the sides of the crate and connect the lower portions of the frames.

The invention is susceptible of various changes in its form, proportions and minor details of construction and the right is herein reserved to make such changes as properly fall within the scope of the appended claim.

Having described the invention what is claimed is:

In a crate, a pair of U-shaped frames each having a horizontal portion of angular cross section and vertical end portions angular in cross section, bottom, side and end slats, U-shaped staples passing through said slats and frames and having ends clinched against the outer surfaces of the frames, and upper and lower tie rods disposed longitudinally of the slats and connecting the frames.

In testimony whereof I affix my signature.

JAMES R. KEITH.